United States Patent
Roesler et al.

(10) Patent No.: US 7,309,753 B2
(45) Date of Patent: Dec. 18, 2007

(54) PROCESS FOR THE PREPARATION OF MOISTURE-CURABLE, POLYETHER URETHANES WITH TERMINAL CYCLIC UREA REACTIVE SILANE GROUPS

(75) Inventors: Richard R. Roesler, Wexford, PA (US); Derek L. Crawford, Oakdale, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 213 days.

(21) Appl. No.: 10/539,218

(22) PCT Filed: Dec. 5, 2003

(86) PCT No.: PCT/US03/38510

§ 371 (c)(1),
(2), (4) Date: Jun. 17, 2005

(87) PCT Pub. No.: WO2004/060952

PCT Pub. Date: Jul. 22, 2004

(65) Prior Publication Data

US 2006/0052568 A1    Mar. 9, 2006

(51) Int. Cl.
C08G 18/28    (2006.01)
C08G 18/48    (2006.01)
C08G 18/71    (2006.01)
C08G 18/83    (2006.01)

(52) U.S. Cl. .................. 528/29; 528/26; 528/38; 528/44; 528/67; 528/69; 528/76; 528/85

(58) Field of Classification Search ................ None
See application file for complete search history.

(56) References Cited

U.S. PATENT DOCUMENTS

| | | | |
|---|---|---|---|
| 4,857,623 A | | 8/1989 | Emmerling et al. .......... 528/28 |
| 5,068,304 A | | 11/1991 | Higuchi et al. ............... 528/28 |
| 5,124,425 A | * | 6/1992 | Higuchi et al. ............... 528/59 |
| 5,227,434 A | | 7/1993 | Katz ............................ 525/419 |
| 5,364,955 A | | 11/1994 | Zwiener et al. .............. 556/418 |
| 5,554,709 A | * | 9/1996 | Emmerling et al. ........... 528/27 |
| 5,670,601 A | * | 9/1997 | Allen et al. .................... 528/76 |
| 5,756,751 A | * | 5/1998 | Schmalstieg et al. ........ 548/110 |
| 6,197,912 B1 | | 3/2001 | Huang et al. ................. 528/28 |
| 6,265,517 B1 | * | 7/2001 | Stuart ........................... 528/28 |
| 6,498,210 B1 | | 12/2002 | Wang et al. ................. 524/588 |
| 6,762,241 B1 | * | 7/2004 | Blum et al. ................. 524/588 |
| 6,809,170 B2 | * | 10/2004 | Roesler et al. ................ 528/28 |
| 6,884,852 B1 | | 4/2005 | Klauck et al. .............. 525/458 |

FOREIGN PATENT DOCUMENTS

EP    0 546 310    6/1993
WO    98/18843    5/1998

* cited by examiner

*Primary Examiner*—Marc S. Zimmer
(74) *Attorney, Agent, or Firm*—Noland J. Cheung; Lyndanne M. Whalen

(57) ABSTRACT

A process for preparing a moisture-curable, polyether urethane containing terminal cyclic urea/reactive silane groups by reacting at an NCO:OH equivalent ratio of 1.5:1 to 2.5:1
a) a hydroxyl component containing i) a polyether containing two hydroxyl groups and one or more polyether segments, wherein the polyether segments have a number average molecular weight of at least 3000 and a degree of unsaturation of less than 0.04 milliequivalents/g, and ii) a polyether containing one hydroxyl group and one or more polyether segments having a number average molecular weight of 1000 to 15,000, with
b) an isocyanate component containing i) a compound containing two isocyanate groups, and ii) a compound containing one isocyanate group, and subsequently reacting this reaction product at an equivalent ratio of isocyanate groups to isocyanate-reactive groups of 0.8:1 to 1.1:1 with
c) a compound containing an aspartate group and a reactive silane group to form an intermediate polyether urethane containing terminal non-cyclic urea/reactive silane groups and converting the non-cyclic urea groups to cyclic urea groups by reacting the intermediate polyether urethane.

15 Claims, No Drawings

PROCESS FOR THE PREPARATION OF MOISTURE-CURABLE, POLYETHER URETHANES WITH TERMINAL CYCLIC UREA REACTIVE SILANE GROUPS

FIELD OF THE INVENTION

The present invention relates to a process for preparing moisture-curable polyether urethanes containing terminal cyclic urea/reactive silane groups from polyether polyols having a low degree of unsaturation and to the use of these polyether urethanes as sealants, adhesives and coatings.

BACKGROUND OF THE INVENTION

Polyether urethanes containing reactive silane groups, also referred to as silane-terminated polyurethanes (STPs), and their use as sealants and adhesives are known and described, e.g., in U.S. Pat. Nos. 5,554,709; 4,857,623; 5,227,434 and 6,197,912; and WO 02/06367. The silane-terminated polyurethanes may be prepared by various methods. In one method the silane-terminated polyurethanes are prepared by reacting diisocyanates with polyether polyols to form isocyanate-terminated prepolymers, which are then reacted with aminosilanes to form the silane-terminated polyurethanes. The sealants may also be prepared by reacting unsaturated monools with diisocyanates to form intermediates containing unsaturated end groups and then converting these unsaturated groups to alkoxysilane groups by hydrosilylation. In another method the sealants are prepared in one step by the reaction of polyether diols with isocyanatosilanes To be useful as sealants the silane-terminated polyurethanes should have a number average molecular weight of 6000 to 20,000. One method of obtaining this molecular weight is to use polyether diols prepared by the KOH process and having a molecular weight of 2000 to prepare the isocyanate-terminated prepolymers. The presence of urethane groups causes the products to have a high viscosity. To achieve suitable application viscosities, the high viscosity is reduced by the addition of higher amounts of plasticizer and lesser amounts of fillers, resulting in more expensive sealant products.

Another method of obtaining high molecular weight sealants is by using high molecular weight polyether diols having a low degree of unsaturation and prepared using special catalysts as described in EP-A 0,546,310, EP-A 0,372,561 and DE-A 19,908,562. When these polyether diols are used, the resulting sealants have excellent tensile strength, but the sealants are too brittle for many applications because the elongation is too low and the 100% modulus is too high.

The preparation of sealants from mixtures of polyfunctional and monofunctional silane-terminated polyurethanes is known and disclosed in U.S. Pat. Nos. 5,554,709 and 4,857,623 and WO 02/06367. However, these references do not disclose the use of polyether polyols having a low degree of unsaturation and aspartate-functional silanes to prepare the sealants.

The preparation of silane-terminated polyether urethanes from aspartate-functional silanes is disclosed in U.S. Pat. No. 5,364,955 and WO 98/18843. In both of these references the polyethers used to prepare polyether urethanes do not have a low degree of unsaturation. In addition, mixtures of polyfunctional and monofunctional silane-terminated polyurethanes are not disclosed. Finally, in the latter reference the polyethers must contain 15 to 40% by weight of ethylene oxide units.

WO 00/26271 discloses the preparation of silane-terminated polyether urethanes from polyether polyols having a low degree of unsaturation and aspartate-functional silanes. The products are prepared by reacting diisocyanates with high molecular weight polyether diols to form NCO prepolymers, which are then capped with aspartate-functional silanes to form silane-terminated polyether urethanes. This application does not disclose mixtures of disilane-terminated polyether urethanes with polyether urethanes containing one reactive silane group.

U.S. Pat. No. 6,265,517 describes a similar process for preparing silane-terminated polyether urethanes from polyether polyols having a low degree of unsaturation and aspartate-functional silanes. The patent requires the starting polyol to have a monool content of less than 31 mole %, and teaches that a relatively high monool content is highly undesirable because monools react with isocyanates thereby reducing crosslinking and curing of the prepolymer. The patent also requires the aspartate silanes to be prepared from dialkyl maleates in which the alkyl groups each contain more than four carbon atoms.

EP 0,372,561 discloses polyether urethanes containing reactive silane groups and prepared from polyether polyols having a low degree of unsaturation. In addition, polyether urethanes containing one reactive silane group are disclosed. This application fails to disclose the use of aspartate-functional silanes to incorporate the reactive silane groups.

The deficiencies of the preceding sealants were overcome in copending applications, U.S. Ser. Nos. 10/690,751, 10/690,955, 10/690,956, 10/690,954 and 10/690,931, which describe moisture-curable, alkoxysilane-functional polyether urethanes containing both polyether urethanes having two or more reactive silane groups and polyether urethanes having one reactive silane group. The moisture-curable polyether urethanes are suitable for use as sealants, adhesives and coatings which possess high tensile strengths and elongations and have a reduced 100% modulus when compared with existing products.

In the copending applications the polyether urethane component containing two or more reactive silane groups is prepared from high molecular weight polyether polyols having a low degree of unsaturation. In addition, at least a portion of the reactive silane groups present in at least one of the two components are incorporated by the use of silanes containing secondary amino groups. Finally, the polyether urethane components described in the copending applications are prepared separately and subsequently blended to form the moisture-curable polyether urethanes according to the invention.

Copending application, U.S. Ser. No. 10/690,953 describes a process for simultaneously preparing moisture-curable polyether urethanes containing a mixture of polyether urethane component having two or more reactive silane groups and a polyether urethane component having one reactive silane group instead of being prepared separately and mixed. The mixture of polyether urethanes retains all of the valuable properties of the polyether urethanes disclosed in the previously described copending applications.

A disadvantage of the moisture-curable polyether urethanes described in the preceding copending applications is that they are not storage stable at moderately elevated temperatures of 50 to 90° C., which may be present in a drum stored in a hot climate.

Accordingly, it is an object of the present invention to provide a process for preparing moisture-curable polyether urethanes at lower production viscosities, in which the resulting products are storage stable at elevated temperatures and also retain all of the valuable properties of the polyether urethanes disclosed in the preceding copending applications, i.e., the products are suitable for use as sealants, adhesives and coatings which possess high tensile strengths and elongations and have a reduced 100% modulus.

This object may be achieved with the process of the present invention in which the moisture-curable polyether urethanes containing a mixture of polyether urethane component having two or more reactive silane groups and a polyether urethane component having one reactive silane group are prepared simultaneously and in which the polyether urethanes contain terminal cyclic urea/reactive silane groups.

The present invention is based on the surprising discovery that the non-cyclic urea groups formed by the reaction of isocyanate groups and aspartate silane groups decompose back into the starting components when stored at moderately elevated temperatures. In accordance with the present invention this decomposition is prevented by converting the non-cyclic urea groups into cyclic urea groups, which are thermally stable.

It is surprising that the polyether urethanes obtained according to the process of present invention can be used to prepare cured resins that possess the same properties as those obtained in accordance with the copending applications because the presence of cyclic urea groups would be expected to result in less flexible cured resins that would not have the same elongation and 100% modulus as cured resins prepared from polyether urethanes containing non-cyclic urea groups.

SUMMARY OF THE INVENTION

The present invention relates to a process for preparing a moisture-curable, polyether urethane containing terminal cyclic urea/reactive silane groups by reacting at an NCO:OH equivalent ratio of 1.5:1 to 2.5:1 a) a hydroxyl component containing
  i) 20 to 100% by weight, based on the weight of component a), of a polyether containing two hydroxyl groups and one or more polyether segments, wherein the polyether segments have a number average molecular weight of at least 3000 and a degree of unsaturation of less than 0.04 milliequivalents/g, provided that the sum of the number average molecular weights of all of the polyether segments per molecule averages 6000 to 20,000, and
  ii) 0 to 80% by weight, based on the weight of component a), of a polyether containing one hydroxyl group and one or more polyether segments having a number average molecular weight of 1000 to 15,000, with
b) an isocyanate component containing
  i) 20 to 100% by weight, based on the weight of component b), of a compound containing two isocyanate groups, and
  ii) 0 to 80% by weight, based on the weight of component b), of a compound containing one isocyanate group, provided that total percentages of a-ii) and b-ii) add up to at least 10, to form an isocyanate-containing reaction product and subsequently reacting this reaction product at an equivalent ratio of isocyanate groups to isocyanate-reactive groups of 0.8:1 to 1.1:1 with c) a compound containing an isocyanate-reactive group and one reactive silane groups in which at least 10 mole % of component c) is a compound corresponding to the formula

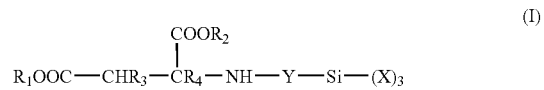

wherein

X represents identical or different organic groups which are inert to isocyanate groups below 100° C., provided that at least two of these groups are alkoxy or acyloxy groups, Y represents a linear or branched alkylene group containing 1 to 8 carbon atoms, $R_1$ and $R_2$ are identical or different and represent organic groups which are inert to isocyanate groups at a temperature of 100° C. or less and $R_3$ and $R_4$ are identical or different and represent hydrogen or organic groups which are inert towards isocyanate groups at a temperature of 100° C. or less, to form an intermediate polyether urethane containing at least a portion of terminal non-cyclic urea/reactive silane groups corresponding to formula II

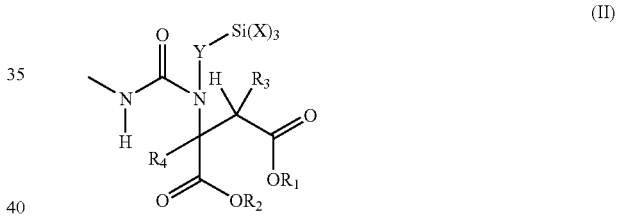

and converting the non-cyclic urea groups to cyclic urea groups by reacting the intermediate polyether urethane in the presence of an acid catalyst and heat to form terminal cyclic urea/reactive silane groups corresponding to formula III and/or formula IV

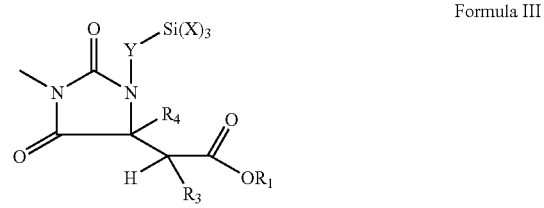

Formula III

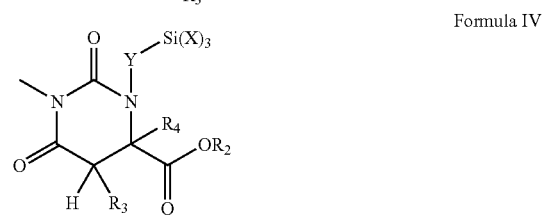

Formula IV

DETAILED DESCRIPTION OF THE INVENTION

In accordance with the present invention the term "reactive silane group" means a silane group containing at least two alkoxy or acyloxy groups as defined by substituent "X". A silane group containing two or three alkoxy and/or acyloxy groups is considered to be one reactive silane group. Also, a urethane is a compound containing one or more urethane and/or urea groups. These compounds preferably contain one or more urethane groups and may optionally contain urea groups. More preferably, these compounds contain both urethane and urea groups. The isocyanate-containing reaction products used for preparing the moisture-curable polyether urethanes may be prepared by several methods. For example, they may be prepared by reacting a mixture of polyether diol a-i) and polyether monool a-ii) with an excess of diisocyanate b-i), to form an isocyanate-containing reaction product containing NCO prepolymers and monoisocyanates formed by the reaction of one mole of a diisocyanate with one mole of a polyether monool. In this embodiment polyether monool a-ii) is present in an amount of at least 10% by weight, based on the weight of component a).

In another embodiment the isocyanate-containing reaction products are prepared by reacting polyether diol a-i) with an excess of diisocyanate b-i) and monoisocyanate b-ii) to form an isocyanate-containing reaction product containing NCO prepolymers and monoisocyanates formed by the reaction of one mole of a monoisocyanate and one mole of a diisocyanate with one mole of a polyether diol. In this embodiment monoisocyanate b-ii) is present in an amount of at least 10% by weight, based on the weight of component b).

It is also possible to use a combination of the preceding processes in which both polyether monools a-ii) and monoisocyanates b-ii) are present.

The isocyanate-containing reaction products are prepared by reacting the isocyanate component with the polyether component at an NCO:OH equivalent ratio of a 1.5:1 to 2.5:1, preferably 1.8:1 to 2.2:1 and more preferably 1.9:1 to 2.1:1 and most preferably 2:1. It is especially preferred to react one mole of the isocyanate component for each equivalent of hydroxyl groups.

When preparing the isocyanate-containing reaction product from diisocyanate b-i), polyether diol a-i) and polyether monool a-ii) at an NCO:OH equivalent ratio of 2:1, the reaction mixture contains the 2/1 adduct of the diisocyanate and diol; minor amounts of higher molecular weight oligomers, such as the 3/2 adduct; a monoisocyanate, which is the 1/1 adduct of the monool and diisocyanate; non-functional polymers, which are formed by the reaction of two molecules of the monool with one molecule of the diisocyanate; various products containing both diols and monools; and a minor amount of unreacted diisocyanate, which can be removed, e.g., by distillation, or which can remain in the reaction mixture.

To form the moisture-curable polyether urethanes according to the invention the isocyanate-containing reaction products are reacted with compounds c) containing reactive silane groups at equivalent ratio of isocyanate groups to isocyanate-reactive groups of 0.8:1 to 1.1:1, preferably 0.9:1 to 1.05:1 and more preferably about 1:1.

The moisture-curable polyether urethanes may also be prepared by reacting an excess of diisocyanates b) with aminosilanes c) to form a monoisocyanate and then reacting the resulting monoisocyanate with a mixture of polyethers a-i) and a-ii) to form the polyether urethanes.

The moisture-curable, polyether urethanes obtained according to the process of the present invention contain polyether urethanes A), which contain two or more, preferably two, reactive silane groups, and polyether urethanes B), which contain one reactive silane group. Also present are polymers C), which are the reaction products of unreacted isocyanates b) with aminosilanes c). Polymers C) are preferably present in an amount of less then 5% by weight.

The reaction mixture also contains non-functional polymers D), which are formed by the reaction of two molecules of the monool with one molecule of the diisocyanate, two molecules of the monoisocyanate with one molecule of the diol, or one molecule of the monool with one molecule of a monoisocyanate. Non-functional polymers D) are generally present in an amount of less than 30% by weight.

In accordance with the present invention it is also possible to adjust the NCO:OH equivalent ratio to form additional amounts of non-functional polymers D) are formed from the reactants as previously described. These polymers remain in the reaction mixture and function as plasticizers during the subsequent use of the moisture-curable, polyether urethanes according to the invention.

Suitable polyethers for use as component a-i) include polyoxypropylene polyethers containing two hydroxyl groups and optionally up to 20% by weight, based on the weight of component a-i), of polyethers containing more than 2 hydroxyl groups. The polyethers contain one or more, preferably one, polyether segment having a number average molecular weight of 3000 to 20,000, preferably 6000 to 15,000 and more preferably 8000 to 12,000. When the polyether segments have a number average molecular weight of 3000, for example, then two or more of these segments must be present so that the number average molecular weights of all of the polyether segments per molecule averages 6000 to 20,000.

Suitable polyols for preparing polymers a) are polyether polyols, in some cases polyoxypropylene polyols, in many instances diols, having a number average molecular weight of 3000 to 20,000, preferably 6000 to 15,000, and more preferably 8000 to 12,000. The polyethers can have a maximum total degree of unsaturation of less than 0.04 milliequivalents/g, in some cases less than 0.02 meq-g (meq/g), in other cases less than 0.01 meq/g and in some situations 0.007 meq/g or less. The amount of unsaturation will vary depending on the method used to prepare the polyether as well as the molecular weight of the polyerther. Such polyether diols are known and can be produced, as a non-limiting example, by the propoxylation of suitable starter molecules. As another non-limiting example, minor amounts (up to 20% by weight, based on the weight of the polyol) of ethylene oxide can be used. If ethylene oxide is used, it can be used as the initiator for or to cap the polypropylene oxide groups. Non-limiting examples of suitable starter molecules include diols such as ethylene glycol, propylene glycol, 1,3-butanediol, 1,4-butanediol, 1,6 hexanediol and 2-ethylhexanediol-1,3. Also suitable are polyethylene glycols and polypropylene glycols.

Suitable methods for preparing polyether polyols are known and are described, for example, in EP-A 283 148, U.S. Pat. Nos. 3,278,457, 3,427,256, 3,829,505, 4,472,560. U.S. Pat. Nos. 3,278,458, 3,427,334, 3,941,849, 4,721,818, 3,278,459, 3,427,335 and 4,355,188. They are preferably prepared using double metal cyanides as catalysts.

In addition to the polyether polyols, minor amounts (up to 20% by weight, based on the weight of the polyol) of low molecular weight dihydric and trihydric alcohols having a molecular weight 32 to 500 can also be used. Suitable examples include ethylene glycol, 1,3-butandiol, 1,4-butandiol, 1,6-hexandiol, glycerine or trimethylolpropane. However, the use of low molecular weight alcohols is less preferred.

Polyethers a-i) are present in a amount of 20 to 100% by weight. When polyether monools a-ii) are used as the sole monofunctional component, polyethers a-i) are present in a minimum amount of 20% by weight, preferably 30% by weight and more preferably 40% by weight, and a maximum amount of 100% by weight, preferably 90% by weight, more preferably 80% by weight and most preferably 70% by weight. The preceding percentages are based on the total weight of polyethers a).

Suitable polyether monools a-ii) are polyether monools having a number average molecular weight of 1000 to 15,000, preferably 3000 to 12,000 and more preferably 6000 to 12,000. The polyether monools are prepared by the alkoxylation of monofunctional starting compounds with alkylene oxides, preferably ethylene oxide, propylene oxide or butylene oxide, more preferably propylene oxide. If ethylene oxide is used, it is used in an amount of up to 40% by weight, based on the weight of the polyether. The polyethers are preferably prepared either by the KOH process or by mixed metal cyanide catalysis. The latter process results in products with low a degree of unsaturation.

In many cases, the polyethers, which as a non-limiting example can be polypropylene oxide polyethers have a maximum total degree of unsaturation of less than 0.04 milliequivalents/g (meq/g) in some cases less than 0.02 meqlg, in other cases less than 0.01 meq/g and in some situations 0.007 meq/g or less. The amount of unsaturation will vary depending on the method used to prepare the polyether as well as the molecular weight of the polyerther. Such polyether monools are known and can be produced, as a non-limiting example by the methods set forth previously for preparing polyethers, a non-limiting example being the polyoxypropylene polyols by the propoxylation of suitable starter molecules. In another non-limiting example, minor amounts (up to 20% by weight, based on the weight of the polyol) of ethylene oxide can also be used. As with the polyethers a-i), if ethylene oxide is used, it can be used as the initiator for or to cap the polypropylene oxide groups.

Examples of suitable starter molecules include aliphatic, cycloaliphatic and araliphatic alcohols, phenol and substituted phenols, such as methanol, ethanol, the isomeric propanols, butanols, pentanols and hexanols, cyclohexanol and higher molecular weight compounds such as nonylphenol, 2-ethylhexanol and a mixture of $C_{12}$ to $C_{15}$, linear, primary alcohols (Neodol 25, available from Shell). Also suitable are unsaturated alcohols such as allyl alcohol; and hydroxy functional esters such as hydroxyethyl acetate and hydroxyethyl acrylate. Preferred are the higher molecular weight monohydroxy compounds, especially nonyl phenol and mixtures of $C_{12}$ to $C_{15}$, linear, primary alcohols.

When polyethers a-ii) are present as the sole monofunctional component, they are present in a minimum amount of 0% by weight, preferably 10% by weight, more preferably 20% by weight and most preferably 30% by weight, and a maximum amount of 80% by weight, preferably 70% by weight and more preferably 60% by weight. The preceding percentages are based on the total weight polyethers a).

Suitable isocyanates b-i) include the known monomeric organic diisocyanates represented by the formula, $R(NCO)_2$, in which R represents an organic group obtained by removing the isocyanate groups from an organic diisocyanate having a molecular weight of 112 to 1,000, preferably 140 to 400. Preferred diisocyanates are those represented by the above formula in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanato-cyclohexyl)-methane, 1,3- and 1,4-bis-(isocyanatomethyl)-cyclohexane, bis-(4-isocyanatocyclo-hexyl)-methane, 2,4'-diisocyanato-dicyclohexyl methane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydro-toluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene and mixtures thereof.

Monomeric polyisocyanates containing 3 or more isocyanate groups such as 4-isocyanatomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates may also be used in an amount of up to 20% by weight, based on the weight of isocyanates b). Also suitable, although less preferred, are polyisocyanate adducts prepared from the preceding monomeric polyisocyanates and containing isocyanurate, uretdione, biuret, urethane, allophanate, iminooxadiazine dione, carbodiimide and/or oxadiazinetrione groups.

Preferred diisocyanates include bis-(4-isocyanatocyclohexyl)-methane, 1,6-hexamethylene diisocyanate, isophorone diisocyanate, α,α,α',α'-tetramethyl-1,3- and/or -1,4-xylylene diisocyanate, 2,4- and/or 2,6-toluylene diisocyanate, and 2,4- and/or 4,4'-diphenylmethane diisocyanate. Especially preferred are isophorone diisocyanate, 2,4-toluylene diisocyanate and mixtures of 2,4- and 2,6-toluylene diisocyanate.

Diisocyanates b-i) are present in a amount of up to 100% by weight. When monoisocyanates b-ii) are used as the sole monofunctional component, diisocyanates b-i) are present in a minimum amount of 20% by weight, preferably 30% by weight and more preferably 40% by weight, and a maximum amount of 100% by weight, preferably 90% by weight, more preferably 80% by weight and most preferably 70% by weight. The preceding percentages are based on the total weight of isocyanates b).

Suitable isocyanates b-ii) include those corresponding to the formula R(NCO), wherein R is defined as previously set forth with regard to the organic diisocyanates. Suitable monoisocyanates include those corresponding to the diisocyanates previously set forth. Examples include butyl isocyanate, hexyl isocyanate, octyl isocyanate, 2-ethylhexyl isocyanate, stearyl isocyanate, cyclohexyl isocyanate, phenyl isocyanate and benzyl isocyanate.

When monoisocyanates b-ii) are present as the sole monofunctional component, they are present in a minimum amount of 0% by weight, preferably 10% by weight, more preferably 20% by weight and most preferably 30% by weight, and a maximum amount of 80% by weight, preferably 70% by weight and more preferably 60% by weight. The preceding percentages are based on the total weight isocyanates b).

Suitable compounds c) containing reactive silane groups are those corresponding to formula I

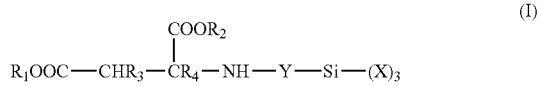

wherein
X represents identical or different organic groups which are inert to isocyanate groups below 100° C., provided that at least two of these groups are alkoxy or acyloxy groups, preferably alkyl or alkoxy groups having 1 to 4 carbon atoms and more preferably alkoxy groups,
Y represents a linear or branched alkylene group containing 1 to 8 carbon atoms, preferably a linear group containing 2 to 4 carbon atoms or a branched group containing 5 to 6 carbon atoms, more preferably a linear group containing 3 carbon atoms,
$R_1$ and $R_2$ are identical or different and represent organic groups which are inert to isocyanate groups at a temperature of 100° C. or less, preferably alkyl groups having 1 to 9 carbon atoms, more preferably alkyl groups having 1 to 4 carbon atoms, such as methyl, ethyl or butyl groups and
$R_3$ and $R_4$ are identical or different and represent hydrogen or organic groups which are inert towards isocyanate groups at a temperature of 100° C. or less, preferably hydrogen.

Especially preferred are compounds in which X represents methoxy, ethoxy groups or propoxy groups, more preferably methoxy or ethoxy groups, and Y is a linear group containing 3 carbon atoms.

The compounds of formula I are prepared by reacting aminosilanes corresponding to formula V

with maleic or fumaric acid esters corresponding to formula VI

Examples of suitable aminoalkyl alkoxysilanes and aminoalkyl acyloxysilanes corresponding to formula V include 3-aminopropyl-triacyloxysilane, 3-aminopropyl-methyldimethoxysilane; 6-aminohexyl-tributoxysilane; 3-aminopropyl-trimethoxysilane; 3-aminopropyl-triethoxysilane; 3-aminopropyl-methyldiethoxysilane; 5-aminopentyl-trimethoxysilane; 5-aminopentyl-triethoxysilane; 4-amino-3,3-dimethyl-butyl-trimethoxysilane; and 3-aminopropyl-triisopropoxysilane. 3-amino-propyl-trimethoxysilane and 3-aminopropyl-triethoxysilane are particularly preferred.

Examples of optionally substituted maleic or fumaric acid esters suitable for preparing the aspartate silanes include the dimethyl, diethyl, dibutyl (e.g., di-n-butyl), diamyl, di-2-ethylhexyl esters and mixed esters based on mixture of these and/or other alkyl groups of maleic acid and fumaric acid; and the corresponding maleic and fumaric acid esters substituted by methyl in the 2- and/or 3-position. The dimethyl, diethyl and dibutyl esters of maleic acid are preferred, while the diethyl esters are especially preferred.

The reaction of primary amines with maleic or fumaric acid esters to form the aspartate silanes of formula III is known and described, e.g., in U.S. Pat. No. 5,364,955, which is herein incorporated by reference.

The compounds corresponding to formula I are preferably used as component c). To obtain the benefits of the present invention, they should be present in an amount of at least 10% by weight, preferably at least 30% by weight, more preferably at least 50% by weight and most preferably at least 80% by weight. In addition to the compounds of formula I, which are required according to the present invention, component c) may also contain aminosilanes that do not correspond to formula I, such as those corresponding to the formula

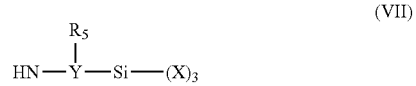

wherein
X and Y are as previously defined and
$R_5$ represents hydrogen or an organic group which is inert to isocyanate groups at a temperature of 100° C. or less, provided that $R_5$ is not a succinate group, preferably hydrogen or an alkyl, cycloalkyl or aromatic group having 1 to 12 carbon atoms and more preferably an alkyl, cycloalkyl or aromatic group having 1 to 8 carbon atoms, or $R_5$ represents a group corresponding to formula VIII

Examples of suitable aminoalkyl alkoxysilanes and aminoalkyl acyloxysilanes of formula VII, which contain primary amino groups, are the compounds of formula V that have previously been described as suitable for preparing the aspartate silanes of formula I.

Examples of suitable aminoalkyl alkoxysilanes and aminoalkyl acyloxysilanes of formula VII, which contain secondary amino groups, include N-phenylaminopropyl-trimethoxysilane (available as A-9669 from OSI Corporation), bis-(γ-trimethoxysilylpropyl)amine (available as A-1170 from OSI Corporation), N-cyclohexylaminopropyl-triethoxysilane, N-methylaminopropyl-trimethoxysilane, N-butylaminopropyl-trimethoxy-silane, N-butylaminopropyl-triacyloxysilane, 3-(N-ethyl)amino-2-methyl-propyl-trimethoxysilane, 4-(N-ethyl)amino-3,3-dimethylbutyl-trimethoxysilane and the corresponding alkyl diethoxy, alkyl dimethoxy and alkyl diacyloxysilanes, such as 3-(N-ethyl)amino-2-methylpropyl-methyl-dimethoxysilane.

The conversion of the non-cyclic urea groups into cyclic urea groups takes place according the following reaction

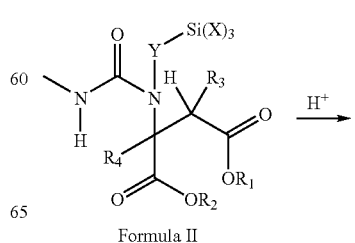

Formula II

-continued

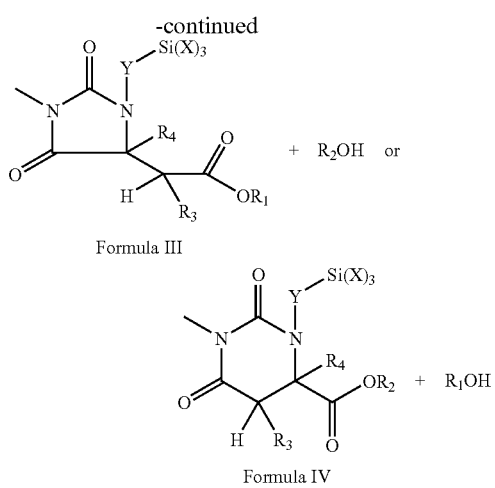

The reaction is carried out in the presence of a catalyst and heat. Suitable catalysts are Brønsted acids, such as mineral acids, carboxylic acids, sulfonic acids and phenols. Preferred catalysts are carboxylic acids, such as formic acid, acetic acid, propionic acid, 2-ethyl hexanoic acid, malonic acid, phthalic acid, and 1,2,3-tricarboxylic propane. Especially preferred are acetic acid and 2-ethyl hexanoic acid.

Higher temperatures accelerate the conversion of the non-cyclic urea groups into cyclic urea groups. Suitable reaction temperatures are from 50 to 200° C. Very low temperatures require long reaction times and result in a very yellow product. Very high temperatures require only short reaction times, but also result in yellow products. The preferred range for minimizing the development of the yellow color is from 70 to 130° C., more preferably from 90 to 120° C. and most preferably from 100 to 120° C.

The conversion of non-cyclic urea groups into cyclic urea groups is accompanied by the release of a mole of alcohol from the succinyl ester. The generated alcohol and the catalyst can be removed from the reaction mixture, for example, by vacuum distillation, or they can be left in the product. If left in the product the released alcohols may undergo a transetherication reaction with the alkoxy groups on the silane. Whether the released alcohols are removed or not is of no consequence, since the products formed with or without vacuum purification, when formulated into a sealant or adhesive, undergo moisture cure to give cured compositions of equivalent performance.

The transetherification reaction can be used to alter the reactivity of the polyether urethanes according to the invention. For example, if a methoxysilane group is converted to an ethoxysilane group or a butoxysilane group, the reactivity of the resulting alkoxysilane groups will be substantially reduced. To the contrary if an ethoxysilane group or a butoxysilane group is converted to a methoxysilane group, the reactivity of the resulting alkoxysilane groups will be substantially increased.

The compositions obtained by the process of the present invention may be cured in the presence of water or moisture to prepare coatings, adhesives or sealants. The compositions cure by "silane polycondensation" from the hydrolysis of alkoxysilane groups to form Si—OH groups and their subsequent reaction with either Si—OH or Si—OR groups to form siloxane groups (Si—O—Si).

Suitable acidic or basis catalysts may be used to promote the curing reaction. Examples include acids such as paratoluene sulfonic acid; metallic salts such as dibutyl tin dilaurate; tertiary amines such as triethylamine or triethylene diamine; and mixtures of these catalysts. The previously disclosed, low molecular weight, basic aminoalkyl trialkoxysilanes, also accelerate hardening of the compounds according to the invention.

The one-component compositions generally may be either solvent-free or contain up to 70%, preferably up to 60% organic solvents, based on the weight of the one-component composition, depending upon the particular application. Suitable organic solvents include those which are known from either from polyurethane chemistry or from coatings chemistry.

The compositions may also contain known additives, such as leveling agents, wetting agents, flow control agents, antiskinning agents, antifoaming agents, fillers (such as chalk, lime, flour, precipitated and/or pyrogenic silica, aluminum silicates and high-boiling waxes), viscosity regulators, plasticizers, pigments, dyes, UV absorbers and stabilizers against thermal and oxidative degradation.

The one-component compositions may be used with any desired substrates, such as wood, plastics, leather, paper, textiles, glass, ceramics, plaster, masonry, metals and concrete. They may be applied by standard methods, such as spraying, spreading, flooding, casting, dipping, rolling and extrusion.

The one-component compositions may be cured at ambient temperature or at elevated temperatures. Preferably, the moisture-curable compositions are cured at ambient temperatures.

The invention is further illustrated but is not intended to be limited by the following examples in which all parts and percentages are by weight unless otherwise specified.

EXAMPLES

Preparation of Silane Functional Aspartate 1

An aspartate resin was prepared according to U.S. Pat. No. 4,364,955. To a 5 liter flask fitted with agitator, thermocouple, nitrogen inlet and addition funnel with condenser were added 1483 g (8.27 equivalents) of 3-amino-propyl-trimethoxysilane (Silquest A-1110, available from OSI Corporation). The addition funnel was used to admit 1423.2 g (8.27 equivalents) of diethyl maleate over a two hour period. The temperature of the reactor was maintained at 25° C. during the addition. The reactor was maintained at 25° C. for an additional five hours at which time the product was poured into glass containers and sealed under a blanket of nitrogen. After one week the unsaturation number was 0.6 indicating the reaction was ~99% complete.

Polyether Diol 1

A polyoxypropylene diol (Acclaim 12200, unsaturation=0.007 meq/g available from Bayer Corporation) having a functionality of 2 and an equivalent weight of 5783.

Polyether Monool 2

203 g (1.00 eq) of Neodol 25 monool (available from Shell Chemical) were charged to a stainless-steel reactor. Zinc hexacyanocobaltate-tert-butyl alcohol complex (0.143 g, prepared as described in U.S. Pat. No. 5,482,908) was added and the mixture was heated with stirring under vacuum at 130° C. for one hour to remove traces of water from the monool starter. Propylene oxide (8547 g, 194.2 eq) was introduced into the reactor over 6 hours. After the epoxide addition was completed, the mixture was heated to 130° C. until no further pressure decrease occurred. The product was vacuum stripped and then drained from the reactor. The resulting polyether had an OH number of 6.4, an equivalent weight of 8750, a functionality of 1, and an unsaturation of less than 0.01 meq/g.

Example 1

Preparation of Cyclic Urea/Reactive Silane Terminated Polyurethane (STP) 1 in Situ from a 74:26 diol:monool Mixture A 5 liter round bottom flask was fitted with agitator, nitrogen inlet, condenser, heater and addition funnel. Into the flask were charged 127.9 g (1.15 eq) of isophorone diisocyanate, 2691.6 g (0.47 eq) of polyether diol 1, 946.7 g (0.11 eq) of polyether monool 2 and 0.78 g of dibutyltin dilaurate. The reaction was heated to 60° C. for 8 hours until the NCO content was 0.58% (theoretical=0.63%). 202.2 g (0.55 eq) of silane functional aspartate 1 were added and the flask was heated at 60° C. for an additional 1 hour until no NCO remained as determined by an IR spectrum. 19.9 g of glacial acetic acid were added and the temperature was raised to 110° C. The reaction mixture was held at 110° C. for three hours until an IR spectrum showed the urea peak had disappeared and a cyclic urea peak had appeared. 19.8 g of vinyl trimethoxysilane were added as moisture scavenger; and 9.9 g of butylated hydroxy toluene and 6.1 g of Naugard 445 (available from Crompton) were added as antioxidants. The resulting product had a viscosity of 54,000 mPa·s at 25° C.

Comparative Example 2

Preparation of Non-Cyclic Urea/Reactive Silane Terminated Polyurethane (STP) 2 in Situ from a 74:26 Diol:Monool Mixture A 3 liter round bottom flask was fitted with agitator, nitrogen inlet, condenser, heater and addition funnel. Into the flask were charged 80.0 g (0.72 eq) of isophorone diisocyanate, 1680.4 g (0.31 eq) of polyether diol 1, 591.7 g (0.07 eq) of polyether monool 2 and 0.53 g of dibutyltin dilaurate. The reaction was heated to 60° C. for 8 hours until the NCO content was 0.60% (theoretical=0.62%). 126.4 g (0.34 eq) of silane functional aspartate 1 were added and the flask was heated at 60° C. for an additional 1 hour until no NCO remained as determined by an IR spectrum. 5.5 g of vinyl trimethoxysilane were added as moisture scavenger; and 6.2 g of butylated hydroxy toluene and 3.7 g of Naugard 445 (available from Crompton) were added as antioxidants. The resulting product had a viscosity of 34,700 mPa·s at 25° C.

Heat Aging of Silanes

Into unlined steel cans were placed 300 g of silane. Four cans of each resin were placed into a 90° C. oven. One can of each resin was removed each week and the viscosities were determined. The following table sets forth the change in viscosity over the testing period.

|       | Viscosity profile, cps @ 90° C. | | | | |
|-------|---------|--------|---------|---------|---------|
| Resin | Initial | 1 week | 2 weeks | 3 weeks | 4 weeks |
| STP 1 | 421 | 454 | 505 | 449 | 551 |
| STP 2 (Comparison) | 541 | 448 | 210 | — | 194 |

Formulation of Silane Sealants

The STP's prepared in situ were formulated into sealants using the following typical formulation and procedure.

Procedure

The following is the standard sealant formulation and procedure used to formulate all of the STP's for testing. Values given for each formula component are percent by weight of the total formula weight. A high-speed centrifugal mixer was used to mix the formulation components in the steps given below. Each mixing period was one minute in length at a speed of 2200 rpm.

Step 1:

To a clean dry mixing container were charged the following:

| STP | 37.5 |
|---|---|
| Plasticizer | 17.5 |
| Adhesion Promoter | 0.8 |
| Catalyst | 0.1 |
| Desiccant | 0.5 |

The ingredients were mixed for one minute in length at a speed of 2200 rpm.

Step 2:

A portion of the filler was added to the mixing container.

| Filler | 23.6 |
|---|---|

The ingredients were mixed for one minute at a speed of 2200 rpm.

Step 3:

The remaining filler was added to the mixing container.

| Filler | 20.0 |
|---|---|

The ingredients were mixed for one minute in length at a speed of 2200 rpm.

Step 4:

The side of the mix container was scraped and the ingredients were mixed for one additional minute at a speed of 2200 rpm to incorporate all of the filler into the mixture.

Step 5:

The resulting product was degassed at 50° C. and under full vacuum (>28 mm Hg) for one hour. The material was used immediately.

Exxon Jayflex DIDP was used as the plasticizer. An aminosilane (Silquest A-1120, available from OSI Corporation) was used as the adhesion promoter. A vinyltrimethoxysilane (Silquest A-171, available from OSI Corporation) was used as the desiccant. The filler used was Specialty Minerals Ultra P Flex precipitated calcium carbonate (mean particle size of 0.07 microns). The catalyst used was dibutyltin dilaurate.

Cure and Testing of Silane Sealants

The sealant formulations were cast onto 0.25 inch thick polyethylene sheets and cured at standard conditions of 20° C., 50% relative humidity for at least two weeks before testing. Tensile strength, percent elongation and 100% modulus were determined according to ASTM D-412. Die "C" tear strengths were determined according to ASTM D-624. The results are set forth in the following table.

Examples 3-12

Tensile Properties for Sealants Prepared from STP 1 and Comparative STP 2

| Example | | Percent Elongation (%) | Tensile Strength (psi) | 100% Modulus (psi) | Tear Strength (pli) |
|---|---|---|---|---|---|
| | Cyclic Urea STP 1 | | | | |
| 3 | Initial (No Heat) | 244 | 309 | 179 | 31 |
| 4 | 1 Wk @ 70 C. | 259 | 356 | 187 | 31 |
| 5 | 1 Wk @ 90 C. | 256 | 319 | 178 | 32 |
| 6 | 4 Wks @ 70 C. | 265 | 342 | 177 | 34 |
| 7 | 4 Wks @ 90 C. | 288 | 312 | 171 | 32 |
| | Urea STP 2 | | | | |
| 8 | Initial (No Heat) | 379 | 311 | 144 | 28 |
| 9 | 1 Wk @ 70 C. | 221 | 78 | 46 | 7 |
| 10 | 1 Wk @ 90 C. | 10 | 10 | 10 | 5 |
| 11 | 4 Wks @ 70 C. | 98 | 44 | 39 | 11 |
| 12 | 4 Wks @ 90 C. | 10 | 10 | 10 | 5 |

The sealant properties of the preceding examples demonstrate that the polyether urethanes containing terminal cyclic urea/reactive silane groups and prepared by the in situ process according to the invention are more heat stable than the comparitive polyether urethanes containing terminal non-cyclic urea/reactive silane groups and prepared by the in situ process.

Although the invention had been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. A process for preparing a moisture-curable, polyether urethane containing terminal cyclic urea/reactive silane groups which comprises reacting at an NCO:OH equivalent ratio of 1.5:1 to 2.5:1
   a) a hydroxyl component containing
      i) 20 to 100% by weight, based on the weight of component a), of a polyether containing two hydroxyl groups and one or more polyether segments, wherein the polyether segments have a number average molecular weight of at least 6,000 and a degree of unsaturation of less than 0.04 milliequivalents/g, provided that the sum of the number average molecular weights of all of the polyether segments per molecule averages 6000 to 20,000, and
      ii) 0 to 80% by weight, based on the weight of component a), of a polyether containing one hydroxyl group and one or more polyether segments having a number average molecular weight of 3,000 to 12,000 with
   b) an isocyanate component containing
      i) 20 to 100% by weight, based on the weight of component b), of a compound containing two isocyanate groups, and
      ii) 0 to 80% by weight, based on the weight of component b), of a compound containing one isocyanate group, provided that total percentages of a-ii) and b-ii) add up to at least 10, to form an isocyanate-containing reaction product and subsequently reacting this reaction product at an equivalent ratio of isocyanate groups to isocyanate-reactive groups of 0.8:1 to 1.1:1 with
   c) a compound containing an isocyanate-reactive group and one reactive silane groups in which at least 10 mole % of component c) is a compound corresponding to the formula

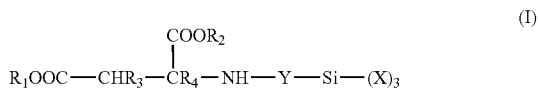

(I)

wherein
   X represents identical or different organic groups which are inert to isocyanate groups below 100° C., provided that at least two of these groups are alkoxy or acyloxy groups,
   Y represents a linear or branched alkylene group containing 1 to 8 carbon atoms,
   $R_1$ and $R_2$ are identical or different and represent organic groups which are inert to isocyanate groups at a temperature of 100° C. or less and
   $R_3$ and $R_4$ are identical or different and represent hydrogen or organic groups which are inert towards isocyanate groups at a temperature of 100° C. or less, to form an intermediate polyether urethane containing at least a portion of terminal non-cyclic urea/reactive silane groups corresponding to formula II

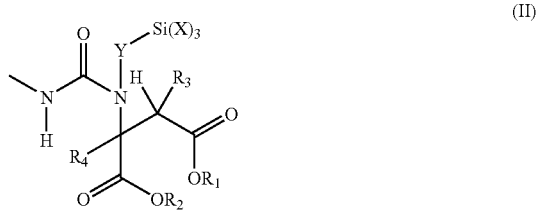

(II)

and converting the non-cyclic urea groups to cyclic urea groups by reacting the intermediate polyether urethane in the presence of an acid catalyst and heat to form terminal cyclic urea/reactive silane groups corresponding to formula III and/or formula IV

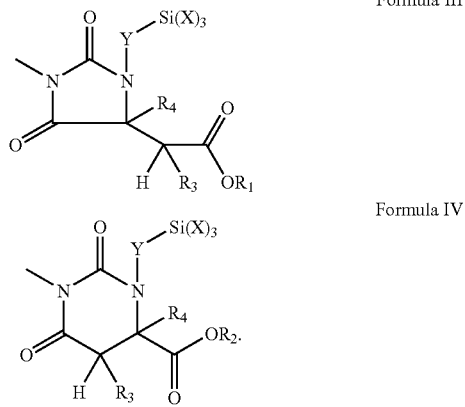

Formula III

Formula IV

2. The process of claim 1 wherein at least 50 mole % of component c) is a compound corresponding to formula I.

3. The process of claim 1 wherein at least 80 mole % of component c) is a compound corresponding to formula I and
X represents identical or different alkoxy groups having 1 to 4 carbon atoms,
Y represents a linear radical containing 2 to 4 carbon atoms or a branched radical containing 5 to 6 carbon atoms and
$R_1$ and $R_2$ are identical or different and represent alkyl groups having 1 to 4 carbon atoms and
$R_3$ and $R_4$ represent hydrogen.

4. The process of claim 1 wherein component a-i) is present in an amount of 20 to 90% by weight, based on the weight of component a); and component a-ii) is present in an amount of 10 to 80% by weight, based on the weight of component a).

5. The process of claim 2 wherein component a-i) is present in an amount of 20 to 90% by weight, based on the weight of component a); and component a-ii) is present in an amount of 10 to 80% by weight, based on the weight of component a).

6. The process of claim 3 wherein component a-i) is present in an amount of 20 to 90% by weight, based on the weight of component a); and component a-ii) is present in an amount of 10 to 80% by weight, based on the weight of component a).

7. The process of claim 1 wherein component b-i) is present in an amount of 20 to 90% by weight, based on the weight of component b); and component b-ii) is present in an amount of 10 to 80% by weight, based on the weight of component b).

8. The process of claim 2 wherein component b-i) is present in an amount of 20 to 90% by weight, based on the weight of component b); and component b-ii) is present in an amount of 10 to 80% by weight, based on the weight of component b).

9. The process of claim 3 wherein component b-i) is present in an amount of 20 to 90% by weight, based on the weight of component b); and component b-ii) is present in an amount of 10 to 80% by weight, based on the weight of component b).

10. The process of claim 1 wherein component a-i) is present in an amount of 30 to 80% by weight, based on the weight of component a); component a-ii) is present in an amount of 20 to 70% by weight, based on the weight of component a).

11. The process of claim 2 wherein component a-i) is present in an amount of 30 to 80% by weight, based on the weight of component a); component a-ii) is present in an amount of 20 to 70% by weight, based on the weight of component a).

12. The process of claim 3 wherein component a-i) is present in an amount of 30 to 80% by weight, based on the weight of component a); component a-ii) is present in an amount of 20 to 70% by weight, based on the weight of component a).

13. The process of claim 1 wherein component b-i) is present in an amount of 30 to 80% by weight, based on the weight of component b); component b-ii) is present in an amount of 20 to 70% by weight, based on the weight of component b).

14. The process of claim 2 wherein component b-i) is present in an amount of 30 to 80% by weight, based on the weight of component b); component b-ii) is present in an amount of 20 to 70% by weight, based on the weight of component b).

15. The process of claim 3 wherein component b-i) is present in an amount of 30 to 80% by weight, based on the weight of component b); component b-ii) is present in an amount of 20 to 70% by weight, based on the weight of component b).

* * * * *